United States Patent [19]

Yamada et al.

[11] 4,118,104
[45] Oct. 3, 1978

[54] SPLIT HOLOGRAM AND METHODS OF MAKING AND USING SAME

[75] Inventors: Yasuo Yamada; Masao Seki, both of Ebina, Japan

[73] Assignee: Fuji Xerox Co., Ltd., Tokyo, Japan

[21] Appl. No.: 659,971

[22] Filed: Feb. 20, 1976

[30] Foreign Application Priority Data

Apr. 17, 1975 [JP] Japan .................................. 50/45813

[51] Int. Cl.² ........................................... G02B 27/00
[52] U.S. Cl. ................................................. 350/3.6
[58] Field of Search ........................................ 350/3.5

[56] References Cited

U.S. PATENT DOCUMENTS

| | | | |
|---|---|---|---|
| 3,547,510 | 12/1970 | De Bitetto | 350/3.5 |
| 3,547,511 | 12/1970 | King | 350/3.5 |
| 3,556,628 | 1/1971 | Burckhardt | 350/3.5 |
| 3,632,869 | 1/1972 | Bartolini et al. | 350/3.5 X |
| 3,719,409 | 3/1973 | Vincelette | 350/3.5 |
| 3,832,027 | 8/1974 | King | 350/3.5 |
| 3,915,551 | 10/1975 | Silverman et al. | 350/3.5 |

Primary Examiner—John K. Corbin
Assistant Examiner—John D. Lee
Attorney, Agent, or Firm—Gerald J. Ferguson, Jr.; Joseph J. Baker

[57] ABSTRACT

A holographic recording method for making a split hologram of an illuminated object from a holographic sensitive member, the method comprising the steps of segmenting both the illuminated object and the holographic sensitive member into a plurality of segments, successively recording a plurality of adjacent segments of the illuminated object onto successive single segments of the holographic sensitive member where each plurality of adjacent segments recorded after the first plurality of adjacent segments includes the unrecorded segment adjacent the last recorded plurality of adjacent segments whereby the split hologram is formed, the split hologram having a plurality of portions respectively corresponding to the plurality of segments of the holographic sensitive member. Also disclosed is a split hologram made in accordance with the above method and methods for using the hologram for information retrieval and image regeneration.

9 Claims, 11 Drawing Figures

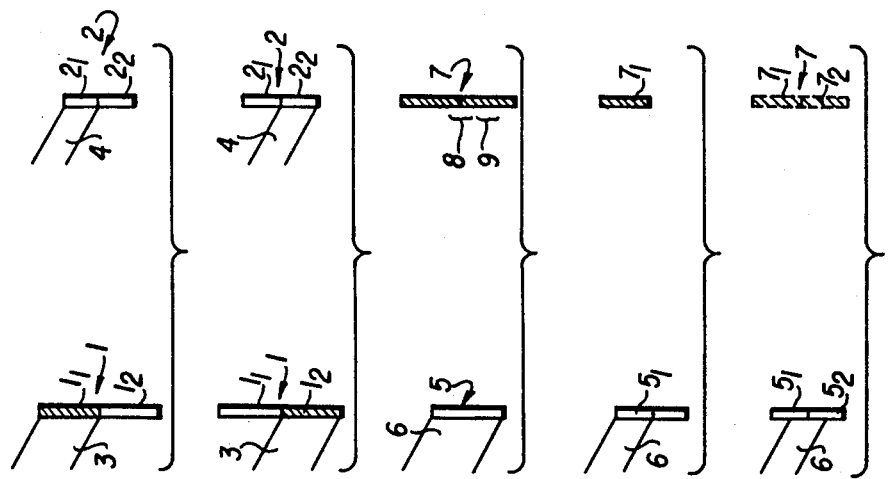
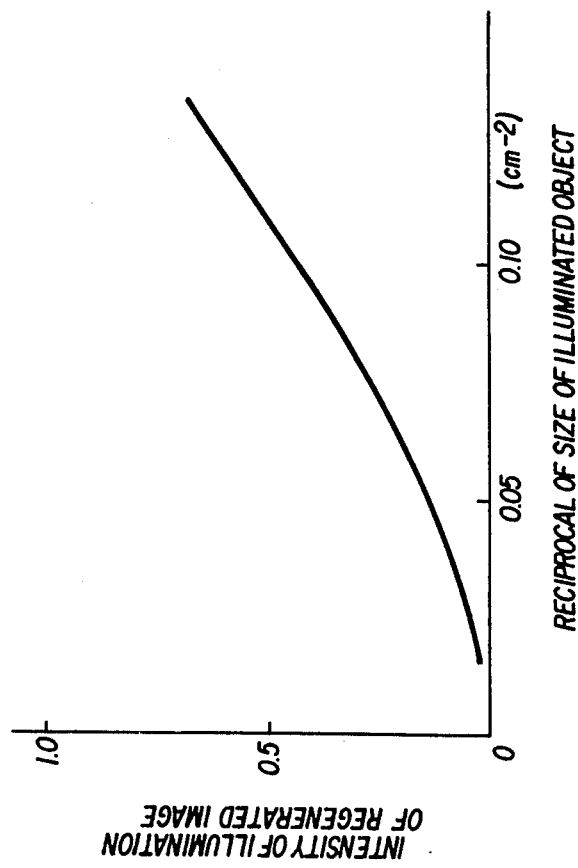

SPLIT HOLOGRAM AND METHODS OF MAKING AND USING SAME

BACKGROUND OF THE INVENTION

This invention relates to a holographic recording method for obtaining a regenerated image having a high intensity of illumination.

Optimum exposure conditions for maximizing the intensity of the illumination of the regenerated image (such as the ratio of the amount of object light of the iluminated object and reference light, the amount of exposure and the like) are generally well known in the holographic recording art.

FIG. 1 gives the relationship between the size of an illuminated object and the regenerated image, which relationship is employed in accordance with the present invention, as will be explained in detail hereinafter. This relationship as shown in FIG. 1 was obtained by illuminating objects of different size with the same source of output light to form different holograms under the aforementioned optimum exposure conditions. A regenerated image was then obtained from each hologram by the same source of output light, after which the intensity of illumination thereof was measured. As can be seen in FIG. 1, when the size of illuminated object is decreased, for example, one half, the intensity of illumination of the regenerated image is increased more than three times. Thus, in accordance with the prior art, if the illuminated object and the holographic sensitive member for recording the object are each divided into two portions, respectively, respective half portions of the divided illuminated object may be recorded on respective half portions of the holographic sensitive member to form a hologram, as will be explained in more detail hereinafter with respect to FIGS. 2(a)-2(e). The hologram thus obtained, may be subjected to coherent regenerating light thereby regenerating the illuminated object. In this manner, the intensity of illumination of the regenerated image increases by more than 1.5 times when compared with the case where the illuminated object is recorded on the holographic sensitive member without dividing the illuminated object and hologram, as will now be explained in further detail.

In FIGS. 2(a)-2(e) for the sake of simplicity, the illuminated object and the holographic sensitive member are each segmented into two portions. As shown in FIG. 2(a), a first one half portion $1_1$ of an illuminated object 1 to be recorded as a hologram is recorded on a first one half portion $2_1$ of a holographic sensitive member 2 under the aforementioned optimum exposure conditions.

More specifically, portion $1_1$ is illuminated by an interferential beam 3 such as a laser beam, which is interfered with as object light 4 by reference light (not shown) on the holographic sensitive member 2. The portion $1_1$ is thus recorded as a hologram image. Thereafter, as shown in FIG. 2(b), the other half portion $1_2$ of the illuminated object 1 is illuminated by interferential beam 3 and recorded on the other half portion $2_2$ of the same holographic sensitive member 2 shown in FIG. 2(b).

Referring to FIG. 2(c), an image may be obtained from a split hologram 5, which corresponds to that obtained from member 2 of FIGS. 2(a) and 2(b). The intensity of illumination of the regenerated image is 1.5 times greater than that obtained when the illuminated object 1 is recorded on the holographic sensitive member 2 without dividing the illuminated object. This results from the fact that since the illumination intensity of the regenerated image of only one-half of object 1 would be three times greater than that of the entire object without dividing it in halves, the above illumination intensity must be divided by two in order to obtain the illumination intensity of the entire object when it is divided in halves.

When the whole illuminated object is to be regenerated, the hologram 5 may be wholly illuminated by regenerating light 6 as shown in FIG. 2(c) to obtain a regenerated image 7 having a boundary indicated at 8 and a lower portion 9. When the illuminated object is to be partially regenerated, a hologram portion $5_1$ (corresponding to portion $2_1$ of FIG. 2(a)) on which the desired information is recorded may be illuminated by regenerating light 6 whereby a regenerated image portion $7_1$ may be obtained, as shown in FIG. 2(d). In this manner, unnecessary portions need not be regenerated, and hence, this method is particularly effective for information retrieval. However, there is a shortcoming in this method in that, when regenerating light 6 is directed onto hologram portion 5, with the intention of obtaining a regenerated image of the object portion $1_1$, the regenerating light decreases in quantity if the light is slightly displaced with respect to hologram portion $5_1$, as shown in FIG. 2(e). Thus, the image portion corresponding to portion 7, is substantially darkened with respect to that of FIG. 2(d) due to the partial presence of image portion $7_2$. Further, whenever hologram 5 is progressively scanned by a regenerating light beam to obtain regenerated image 7, the intensity of illumination of image portion $7_1$ will fluctuate.

SUMMARY OF THE INVENTION

It is a primary object to this invention to overcome the disadvantages noted above with respect to prior art devices by providing an improved split hologram together with methods for making the hologram where there can be produced a regenerated image having a constant high intensity of illumination.

It is a further object of this invention to obtain a regenerated image of constant brightness even if the regenerating beam illuminates both sides of a boundary within a split hologram.

It is a further object of this invention to also utilize the phenomenon that the intensity of illumination of the regenerated image varies with the size of the illuminated object under optimum exposure conditions. These and other objects of the invention will become apparent from a reading of the specification and claims taken with the drawing.

BRIEF DESCRIPTION OF THE DRAWINGS

FIG. 1 is a graph showing the relationship between the size of illuminated object and the intensity of the regenerated image.

FIGS. 2(a) to 2(e) are diagrammatic views of a prior art holographic recording method utilizing the relationship shown in FIG. 1.

DETAILED DESCRIPTION OF THE PREFERRED EMBODIMENTS OF THE INVENTION

Figure 3A:
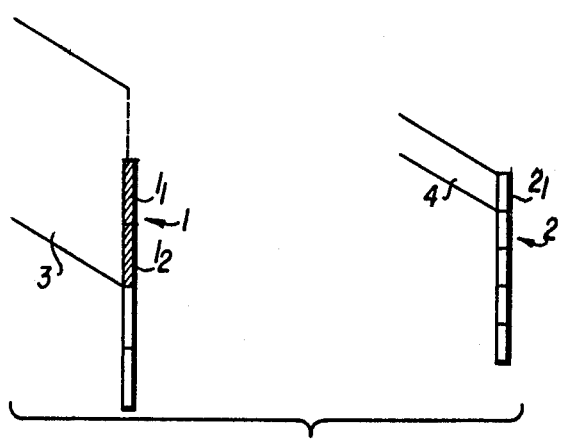
FIGS. 3(a) to 3(e) are diagrammatic views of an illustrative embodiment of this invention.
Figure 3B:
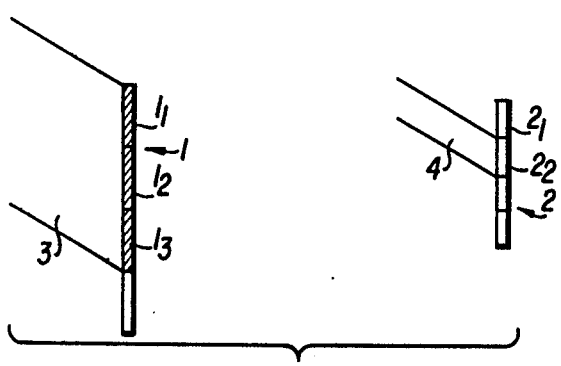
Figure 3C:
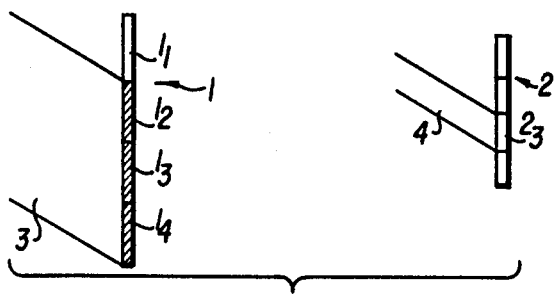
Figure 3D:
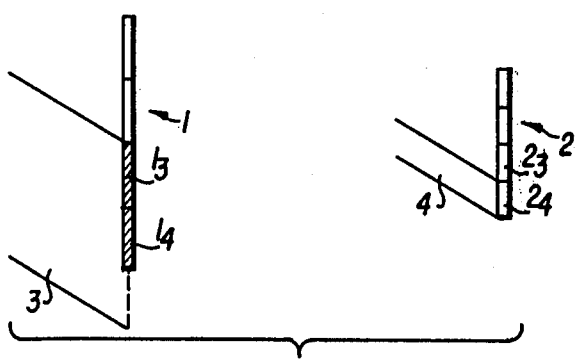
Figure 3E:
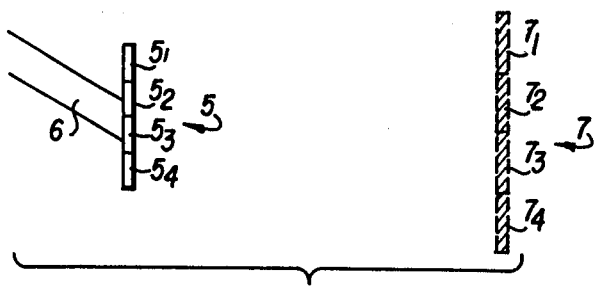

An illustrative embodiment of a method in accordance with this invention will now be described with reference to FIGS. 3(a) to 3(e). In FIG. 3, an illuminated object 1 is divided into four portions of segments. First, referring to FIG. 3(a), a portion including an upper one fourth portions $1_1$ and $1_2$ of the illuminated object 1 is illuminated by an interferential beam 3 such as a laser beam and is then recorded in a conventional holographic manner on one segment of holographic sensitive member 2 — that is, on an upper one fourth portion $2_1$ under optimum exposure conditions. Thereafter, as shown in FIG. 3(b), another portion, including three adjacent segments $1_1$, $1_2$ and $1_3$ of the illuminated object 1 is simultaneously illuminated by beam 3 and recorded on a portion $2_2$ adjacent the already recorded portion $2_1$ of holographic sensitive member 2. Thereafter, in a manner similar to that above, three segments $1_2$, $1_3$ and $1_4$ adjacent to one another are illuminated by interferential beam 3 and recorded on a predetermined portion $2_3$ of holographic sensitive member 2, as shown in FIG. 3(c). Next, a portion including a one-fourth portion at the lower end of illuminated object 1 is recorded on a portion $2_4$ adjacent segment $2_3$ of holographic sensitive member 2 as shown in FIG. 3(d) to form a hologram 5 of illuminated object 1 as shown in FIG. 3(e).

The aforementioned hologram 5 may be recorded merely by relative successive movement of illuminated object 1, object light 4 on holographic sensitive member 2, and a position with respect to the reference light (not shown). In this case, it may be designed so that both the illuminated object 1 and the sensitive member 2 are moved or the object illuminating light is moved. Also, it will of course be appreciated that an image regenerated from respective portions adjacent to one another of the hologram should be recorded so as not to produce inconveniences caused by joints and the like.

In order to obtain a regenerated image from hologram 5, the hologram may be illuminated by regenerating light 6. Since a one fourth segment such as segment $1_2$ is recorded as information on segments $2_1$, $2_2$ and $2_3$ of holographic sensitive member 2, divided holograms $5_1$, $5_2$ and $5_3$ each contain information about segment $1_2$. Thus, even if the regenerating light 6 illuminates portions of, for example, both $5_2$ and $5_3$ — that is, the boundaries between the divided holograms, a regenerated image may nevertheless be formed since the information contained in both of divided holograms $5_2$ and $5_3$ is utilized. As a consequence, a regenerated image of constant high intensity of illumination may be obtained irrespective of which portions are illuminated. Thus, since the regenerated image 7 may always be obtained with constant high intensity of illumination even if the illumination position of the regenerating light 6 should be somewhat displaced, this method is particularly useful for effecting image recording and regeneration particularly by linear scanning of a light beam.

As is apparent from the detailed description discussed above, when a split hologram is produced according to this invention and utilized for image regeneration, the regenerated image is not dark even when the illumination position of the regenerating light is displaced. Therefore, if the regenerated image is obtained by scanning the hologram with a light beam, a regenerated image having high intensity of illumination will be obtained without fluctuation in the illumination intensity.

What is claimed is:

1. A holographic recording method for making a split hologram of an illuminated object from a holographic sensitive recording member, said method comprising the steps of
    segmenting the illuminated object into a plurality of single object segments,
    segmenting the holographic sensitive recording member into a plurality of single recording segments respectively corresponding to said plurality of single object segments, said recording segments being successively disposed on said holographic sensitive recording member from a first one to a last one of said single recording segments,
    recording a plurality of different adjacent object segments of said illuminated object onto successive single recording segments of said holographic sensitive recording member where each plurality of different adjacent object segments recorded onto one of said single recording segments, after the first plurality of different adjacent object segments are recorded on said first of said single recording segments, includes the unrecorded object segment adjacent the last recorded plurality of adjacent object segments
    whereby said split hologram is formed, the split hologram having a plurality of portions respectively corresponding to said plurality of recording segments of the holographic sensitive recording member.

2. A method as in claim 1 where the first and last plurality of adjacent segments recorded each comprise two segments and the remaining plurality of adjacent segments recorded each comprise three segments.

3. A split hologram of an illuminated object made from a holographic sensitive recording member by segmenting the illuminated object into a plurality of segments, segmenting the holographic sensitive recording member into a plurality of single recording segments respectively corresponding to said plurality of single object segments, said recording segments being successively disposed on said holographic sensitive recording member from a first one to a last one of said single recording segments, recording a plurality of different adjacent object segments of said illuminated object onto successive single recording segments of said holographic sensitive recording member where each plurality of different adjacent object segments recorded onto one of said single recording segments, after the first plurality of different adjacent object segments are recorded on said first of said single recording segments, includes the unrecorded object segment adjacent the last recorded plurality of adjacent object segments whereby said split hologram is formed, the split hologram having a plurality of portions respectively corresponding to said plurality of recording segments of the holographic sensitive recording member.

4. A holographic image generating method comprising
    providing a hologram of an illuminated object made from a holographic sensitive recording member by segmenting the illuminated object into a plurality of segments, segmenting the holographic sensitive recording member into a plurality of single recording segments respectively corresponding to said plurality of single object segments, said recording segments being succesively disposed on said holographic sensitive recording member from a first one to a last one of said single recording segments, recording a plurality of different adjacent object segments of said illuminated object onto successive single recording segments of said holographic sensitive recording member where each plurality of different adjacent object segments recorded onto one of said single recording segments, after the first plurality of different adjacent object segments are recorded on said first of said single recording segments, includes the unrecorded object segment adjacent the last recorded plurality of adjacent object segments whereby said split hologram is formed, the split hologram having a plurality of portions respectively corresponding to said plurality of recording segments of the holographic sensitive recording member;

directing a beam of regenerating light onto one of said portions of said split hologram to thereby produce a regenerated image corresponding to said hologram portion and thus retrieve the information contained therein whereby the illumination intensity of said regenerated image will remain substantially constant even though said beam of regenerating light is directed on the boundary between said one hologram portion and another hologram portion adjacent thereto.

5. A holographic image generating method comprising providing a hologram of an illuminated object made from a holographic sensitive recording member by segmenting the illuminated object into a plurality of segments, segmenting the holographic sensitive recording member into a plurality of single recording segments respectively corresponding to said plurality of single object segments, said recording segments being successively disposed on said holographic sensitive recording member from a first one to a last one of said single recording segments, recording a plurality of different adjacent object segments of said illuminated object onto successive single recording segments of said holographic sensitive recording member where each plurality of different adjacent object segments recorded onto one of said single recording segments, after the first plurality of adjacent object segments are recorded on said first of said single recording segments, includes the unrecorded object segment adjacent the last recorded plurality of adjacent object segments whereby said split hologram is formed, the split hologram having a plurality of portions respectively corresponding to said plurality of recording segments of the holographic sensitive recording member;

scanning a beam of regenerating light onto successive portions of said split hologram to thereby produce a regenerated image of said illuminated object whereby the illumination intensity will be substantially constant over said regenerated image.

6. A holographic recording method as in claim 1 where said plurality of different, adjacent object segments are sequentially recorded onto said successive single recording segments.

7. A holographic recording method as in claim 3 where said plurality of different, adjacent object segments are sequentially recorded onto said successive single recording segments.

8. A holographic recording method as in claim 4 where said plurality of different, adjacent object segments are sequentially recorded onto said successive single recording segments.

9. A holographic recording method as in claim 5 where said plurality of different, adjacent object segments are sequentially recorded onto said successive single recording segments.

* * * * *